(12) United States Patent
Chua

(10) Patent No.: US 10,140,596 B2
(45) Date of Patent: Nov. 27, 2018

(54) THIRD PARTY AUTHENTICATION OF AN ELECTRONIC TRANSACTION

(76) Inventor: Bryan S. M. Chua, San Francisco, CA (US)

( * ) Notice: Subject to any disclaimer, the term of this patent is extended or adjusted under 35 U.S.C. 154(b) by 2485 days.

(21) Appl. No.: 10/893,651

(22) Filed: Jul. 16, 2004

(65) Prior Publication Data

US 2006/0015358 A1 Jan. 19, 2006

(51) Int. Cl.
*G06Q 20/02* (2012.01)
*G06Q 20/04* (2012.01)
*G06Q 20/40* (2012.01)

(52) U.S. Cl.
CPC ............ *G06Q 20/02* (2013.01); *G06Q 20/04* (2013.01); *G06Q 20/40* (2013.01); *G06Q 20/4014* (2013.01)

(58) Field of Classification Search
CPC ... H04L 63/08; H04L 12/2856; H04L 9/0866; G06C 20/3674; G06Q 20/40; G06Q 20/3674; G06F 21/31
USPC ...................... 705/35–45; 713/202, 172, 185
See application file for complete search history.

(56) References Cited

U.S. PATENT DOCUMENTS

2002/0058494 A1 * 5/2002 Timonen et al. ............. 455/405
2002/0194205 A1 * 12/2002 Brown et al. ................. 707/200
2003/0001459 A1 * 1/2003 Scott ............................. 310/339
2003/0046551 A1 * 3/2003 Brennan ....................... 713/185
2004/0059952 A1 * 3/2004 Newport et al. .............. 713/202
2004/0255119 A1 * 12/2004 Ukeda et al. ................. 713/169
2005/0050330 A1 * 3/2005 Agam et al. .................. 713/172

FOREIGN PATENT DOCUMENTS

WO WO 03/003321 * 6/2002

* cited by examiner

*Primary Examiner* — Hao Fu
(74) *Attorney, Agent, or Firm* — Imperium Patent Works; T. Lester Wallace; Amir V. Adibi

(57) ABSTRACT

A first identity credential (for example, a username and password), in conjunction with a second identity credential (for example, a token identifier and a token-generated password) verified by an authentication provider, permits access to a protected resource (for example, a bank account) maintained by a service provider (for example, a bank) where the service provider is a separate entity from the authentication provider. Such separation of the service provider from the authentication provider allows multiple service providers to use the same authentication provider such that subscribers of services from multiple service providers may register a single authentication provider, and thus use a single method to produce the second identity credential. An authentication provider provides a common validation service to a plurality of unrelated service providers. An electronic user interface and a key-chain token for carrying out the authentication process are also disclosed.

25 Claims, 5 Drawing Sheets

THIRD PARTY AUTHENTICATION OF AN ELECTRONIC TRANSACTION

FIELD OF THE INVENTION

This invention relates to the field of electronic security.

BACKGROUND INFORMATION

It is becoming common for users to make financial transactions across networks. Performing financial transactions across a network can introduce a security risk because a thief can impersonate the user and illicitly access the account.

In one example, a user engages in on-line banking and accesses an account at a bank. Typically, the user logs onto a web page of the bank and accesses the bank account through this web page after entering a username and password. A thief sends the unsuspecting user an email that impersonates an official email communication from the bank. The email asks the user to update account information such as address information on file at the bank. The user responds by typing in sensitive information such as the user account number, username and password. This sensitive information is then returned to the thief rather than the bank. Once the thief has the information, the thief uses the information to access the user's bank account.

In a second example, a user is not fooled into responding to a communication from a thief masquerading as an official communication from the bank. Rather, the thief observes the user when the user is engaging in a legitimate transaction with the bank. The thief may, for example, use a video camera to capture the actions of the user or install a software program that records keystrokes when the user types on a computer keyboard. This may occur, for example, in an airport or busy public place. The user types the username and password into the computer when engaging in the transaction. The thief captures the transaction and records the keystrokes of the user and possibly the contents of the screen of the computer being used. The thief then views the recording, generally at a much slower rate, and records the user's keystrokes and the screen contents. Once the thief has the username and password, the thief can use the information to access the user's bank account.

A solution to these security problems is currently being used, primarily in Europe. The user is issued a token by the bank. The token may be an electronic security token that generates passwords. The token may be a scratch off ticket that reveals passwords. When the user engages in the transaction with the bank, the user also supplies a password provided by the token. Because the bank originally supplied the user with the token, the bank knows which passwords should be generated by the token issued to a particular user. The bank uses the supplied password to verify that the user is also the correct holder of the token.

If a thief were to steal the electronic token or the scratch off token, and if the thief had the username and password, then the thief may still be able to impersonate the user and gain access to the account. An electronic token may therefore require the user to enter a Personal Identification Number (PIN) such that the password generated by the token is a function of the PIN. If a thief were to steal the electronic token, the thief would not be able to use the token to access the bank account unless the thief were also able to learn the PIN required by the token. Entering the wrong PIN into the token will generate a password, but the password will be known by the bank to be a false password. The bank may then deny attempts to gain access to an account with a false password. This requires the thief to steal a physical object from the user, which is harder than stealing electronic data. This added step tends to reduce attempts by thieves to gain access to bank accounts of users who use tokens.

With the increasing use of such tokens, a problem has developed in that a user may be required to carry multiple tokens in order to be able to access different accounts. The user may, for example, use one electronic token with one PIN in order to access a bank account. The same user may, for example, use a second electronic token and a second PIN in order to access a stock trading account. The user may use a third scratch-off ticket to access a second bank account. The use of multiple tokens and possibly multiple token PINs is cumbersome and confusing and may lead to the user using the wrong token and PIN to attempt to access an account. The user is more likely to forget the particular PIN required by a particular token if the token is but one of multiple tokens having different passwords. In addition, carrying multiple tokens is cumbersome and may lead to confusion regarding which token is required to access each account.

A solution is desired.

SUMMARY

A method involves an authentication provider and one or more service providers. One service provider may, for example, be a bank and a second service provider may be a stock brokerage. The authentication provider provides a token to a user. The token may, for example, be an electronic token having a token identifier that uniquely identifies the token. The user has a bank account with the first service provider (the bank) and a brokerage account with the second service provider (stock brokerage). Each of the two accounts has a different identity credential, where an identity credential may be, for instance a username and password. In addition, the user supplies the token identifier to the first service provider; this token identifier is thereafter stored by the first service provider in association with the first identity credential. Forming the association between the first identity credential and the token identifier is called "token registration." The first service provider, by establishing that association, establishes a relationship wherein the first service provider trusts the authentication provider to authenticate a second identity credential.

To initiate a bank transaction with the first service provider, the user uses a personal computer or automated teller machine (ATM) or other network-connected device. The user uses the network-connected device to supply the first identity credential (such as a username and password) to the first service provider. Along with the first identity credential, the user supplies a password generated by the token. The first identity credential and the token-generated password can, for example, be entered into separate fields in a web form, wherein the web form is served by a server operated by the first service provider.

The first service provider receives the first identity credential and the token-generated password, and verifies the first identity credential as being associated with the bank account of the user. The first service provider also forwards to the authentication provider the second identity credential. The second identity credential includes: 1) the token identifier (stored by the first service provider in association with the bank account), and 2) the password generated by the token (provided to the first service provider by the user). The authentication provider uses the token identifier and the token-generated password to verify that the token identifier and the token-generated password form a valid second identity credential. The authentication provider returns verification (of the second identity credential) back to the first service provider. If the first service provider verifies the first identity credential and receives verification of the second identity credential, then the first service provider grants the user access to the bank account.

In addition to using the token to obtain access to the bank account maintained by the first service provider, the user can use the same token to gain access to the brokerage account maintained by the second service provider. In the same way that the first service provider stored the token identifier in the example above, the second service provider also stores the token identifier. The user uses a network-connected device to supply a third identity credential (such as a username and password) to the second service provider along with a password generated by the token. The second service provider verifies the third identity credential in association with the holder of the brokerage account. The second service provider forwards the second identity credential (comprised of the token identifier and the token-generated password) to the authentication provider. The authentication provider verifies the second identity credential and returns verification to the second service provider. If the second service provider verifies the third identity credential and receives verification of the second identity credential, then the second service provider grants the user access to the brokerage account.

In one aspect, the authentication provider is a server that does not receive or store any information about the user or the user's accounts at the service providers. The authentication provider merely receives token identifiers and token-generated passwords (second identity credentials) and verifies their authenticity. If a thief were to penetrate the authentication provider and obtain information stored there, the thief is still unable to learn the identity of the user or learn the identity of the account of the user. If the authentication provider stored information about the identity of the user, then the thief would potentially by able to target the user and masquerade as a service provider to solicit password and username information from an unsuspecting user. In accordance with one aspect, information about the identity of the user and about the user's accounts is never forwarded to the authentication provider.

This summary does not purport to define the invention. The invention is defined by the claims.

DETAILED DESCRIPTION

Figure 1:
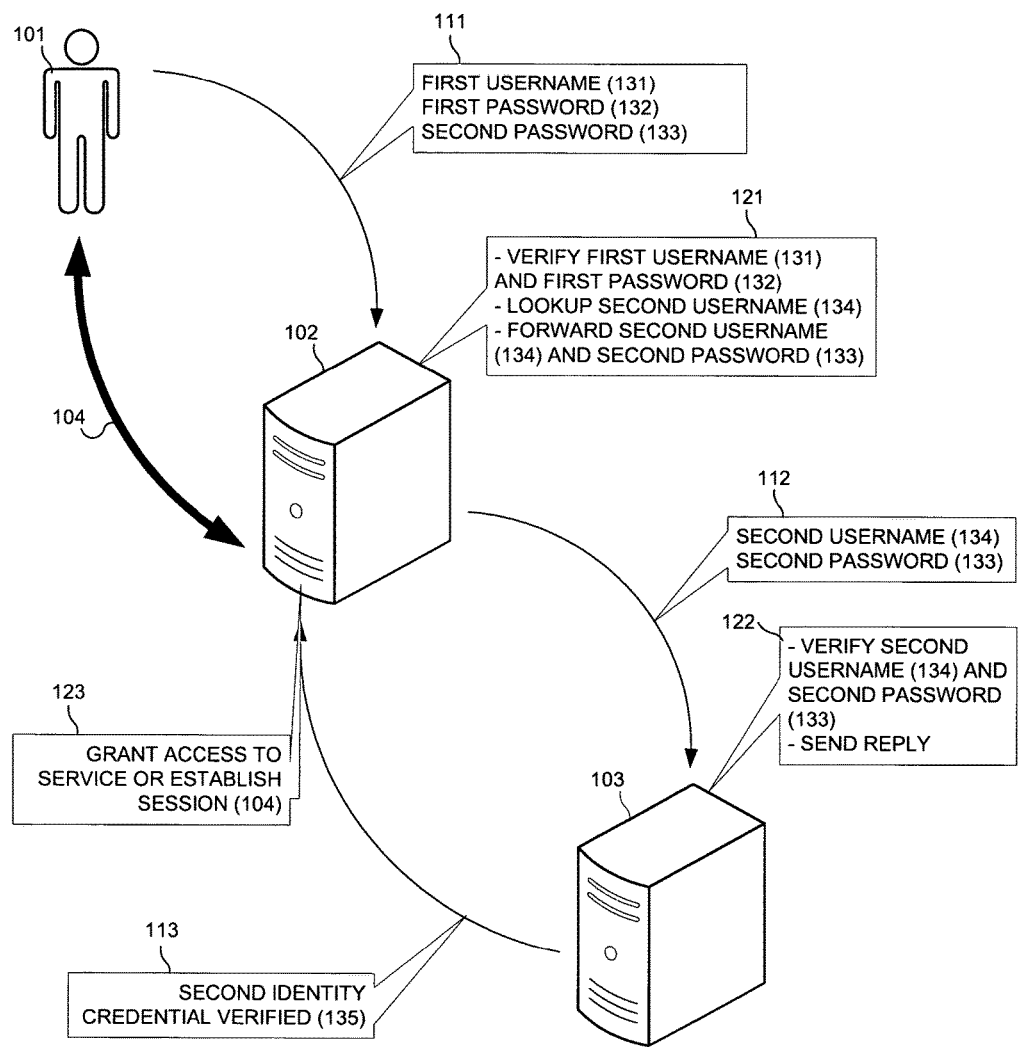
FIG. 1 shows a complete transaction between a subscriber, service provider and authentication provider.

FIG. 1 shows a transaction resulting in establishing a session. In order to establish the session 104 with the service provider 102, the subscriber 101 sends a message 111 containing a first username 131, a first password 132, and second password 133 to the service provider 102. The service provider 102 verifies that the first username 131 with the first password 132 identify the user 101. The service provider 102 correlates the identity of the user 101 with the second username 134, established through prior arrangement. The service provider 102 sends a message 112 containing the second username 134 and the second password 133 to the authentication provider 103 designated through prior arrangement (step 121). The authentication provider 103 verifies that the second username 134 and the second password 133 represent a valid credential and sends a reply message 113 containing the credential status 135 (step 122) to the service provider 102. Upon receipt of a successful reply message 113, the service provider 102 initiates the session 104 with the subscriber 101 (step 123).

Figure 2:
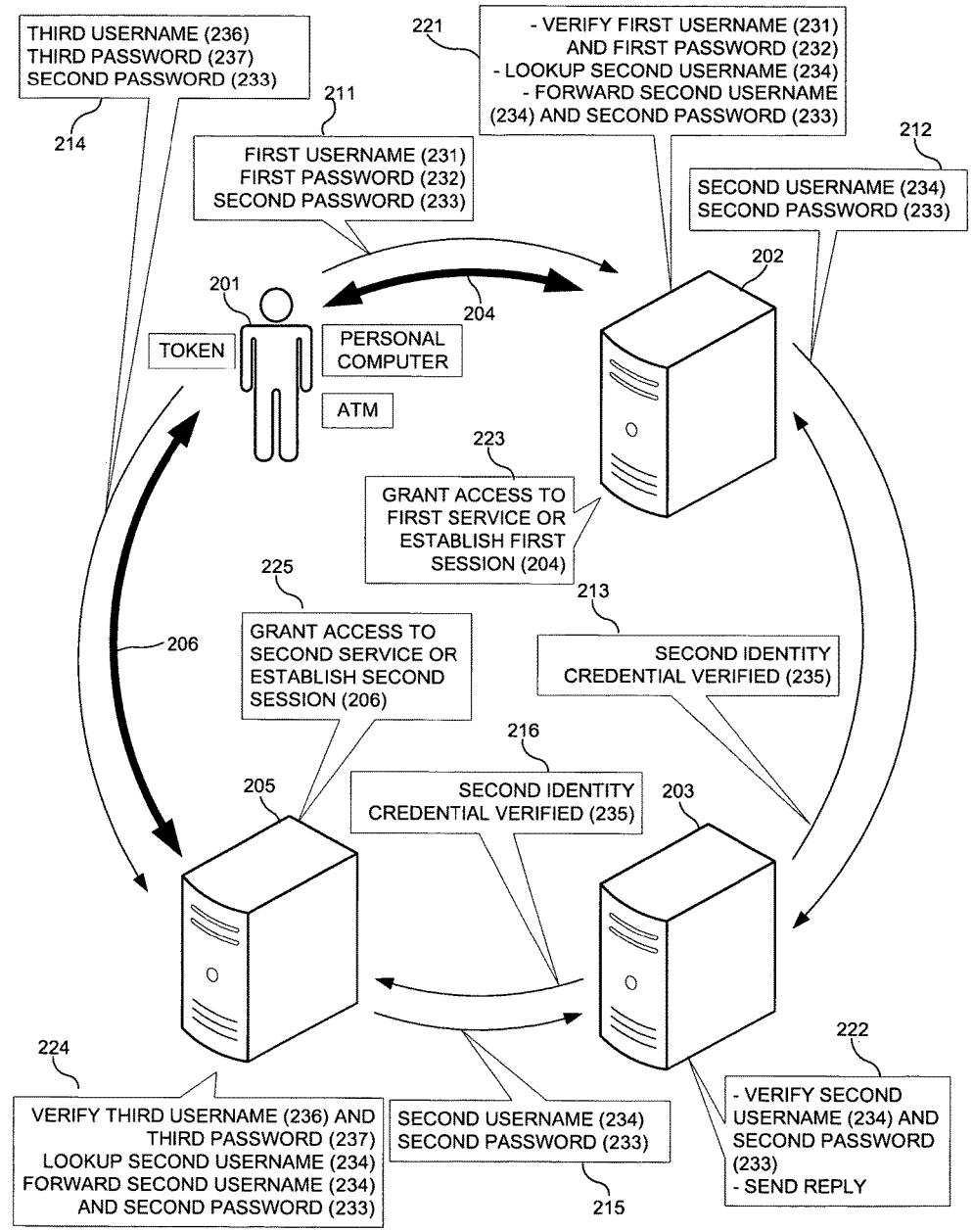
FIG. 2 shows two complete transactions between a subscriber, two different service providers, and an authentication provider.

FIG. 2 illustrates a system involving the establishment of two transaction sessions. In order to establish a first session 204 with a first service provider 202 and a second session 206 with service provider 205, the subscriber 201 sends a message 211 containing a first username 231, a first password 232, and a second password 233 to the first service provider 202. The first service provider 202 verifies that the first username 231 with the first password 232 identify the user 201. The first service provider 202 correlates the identity of the user 201 with the second username 234 established through prior arrangement. The first service provider 202 sends a message 212 containing the second username 234 and the second password 233 to the authentication provider 203 known through prior arrangement (step 221). The authentication provider 203 verifies that the second username 234 and the second password 233 represent a valid credential and sends a reply message 213 containing the credential status 235 (step 222) to the first service provider 202. Upon receipt of a successful reply message 213, the first service provider 202 initiates the session 204 with the subscriber 201 (step 223). In order to establish a second session 206 with a second service provider 205, the subscriber 201 sends a message 214 containing a third username 236, a third password 237, and the second password 233 to the second service provider 205. The second service provider 205 verifies that the third username 236 with the third password 237 identify the user 201. The second service provider 205 correlates the identity of the user 201 with the second username 234 established through prior arrangement. The second service provider 205 sends a message 215 containing the second username 234 and the second password 233 to the authentication provider 203 known through prior arrangement (step 224). The authentication provider 203 verifies that the second username 234 with the second password 233 represent a valid credential and sends a reply message 216 containing the credential status 235 to the second service provider 205 (step 222). Upon receipt of the successful reply message 216, the second service provider 205 initiates the session 206 with the subscriber 201 (step 225).

Figure 3:
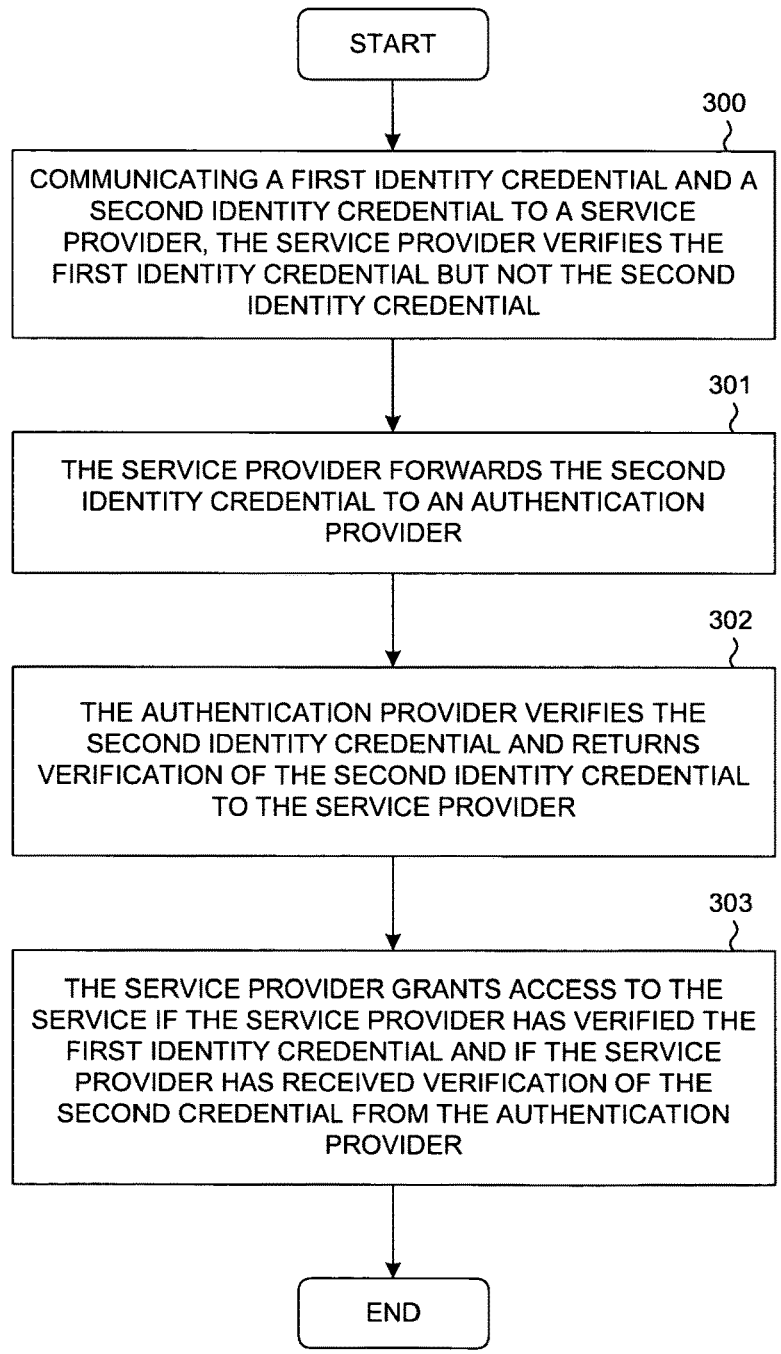
FIG. 3 is a flow chart of a method of establishing an on-line banking session in accordance with one embodiment of the present invention.

FIG. 3 shows the complete method of establishing a session. A user communicates both a first identity credential and a second identity credential to a service provider. The service provider verifies the first identity credential but does not have sufficient information or authority to verify the second identity credential (step 300). The service provider communicates the second identity credential to an authentication provider (step 301). The authentication provider has been authorized to provide verification of the second identity credential through prior arrangement with the service provider. The authentication provider verifies the second identity credential and communicates the response back to the service provider (step 302). Upon both the successful verification of the first identity credential by the service provider and communication of successful verification of the second identity credential by the authentication provider, the service provider grants access to the requested service (step 303).

Figure 4:
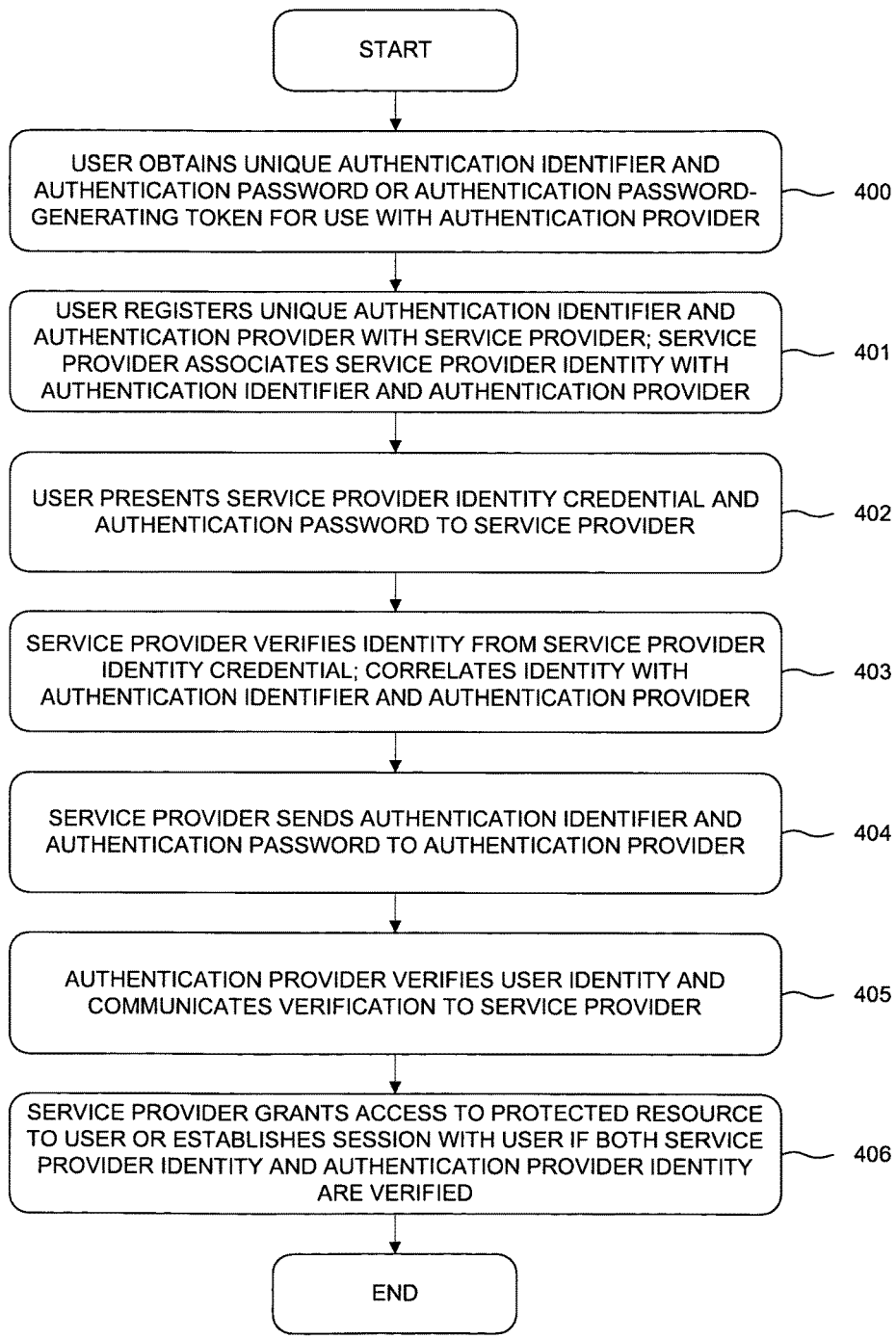
FIG. 4 is a flow chart of a method of operation of a system in accordance with an embodiment of the present invention.

FIG. 4 depicts the entire sequence of events. A user establishes an identity with an authentication provider. The authentication provider identity credential is comprised of an identifier and a secret such as a username and password combination or password-generating device with a serial number (step 400). The user registers the authentication identity and the authentication provider with a service provider (step 401). When the user wishes to access a protected resource or establish a session with the service provider, the user establishes authority by presenting the service provider identity credential with the authentication password or a token-generated authentication password (step 402). The service provider verifies the service provider identity credential and retrieves the associated authentication identity and authentication provider (step 403). The service provider sends the retrieved authentication identifier and the user-provided authentication password to the associated service provider (step 404). The authentication provider verifies the identity credential from the supplied authentication identifier and authentication password and communicates the response to the service provider (step 405). The service provider grants access to the desired resource or establishes a session with the user after successful authentication of both the service provider identity credential and the associated authentication credential (step 406). In order to establish additional sessions with the same service provider, the user repeats steps 402 through steps 406. In order to establish sessions with additional service providers, the user repeats steps 401 through step 406.

In another example of the system of FIG. 2, a merchant is disposed between the user and a service provider. The service provider is a credit card company. The user attempting to make a transaction gives a credit card along with a token-generated password to the merchant. The merchant in turn forwards the information to the service provider. The service provider verifies the first identity credential (credit card number and expiration date) and forwards a second identity credential (a token-generated password and a token identifier stored by the service provider in association with the credit card number) to the authentication provider. The authentication provider verifies the second identity credential and returns verification to the service provider (to the credit card company). If the first identity credential and the second identity credential are verified, then the service provider (credit card company) performs a service (returns an authorization code based on the availability of funds) to the merchant.

Figure 5:
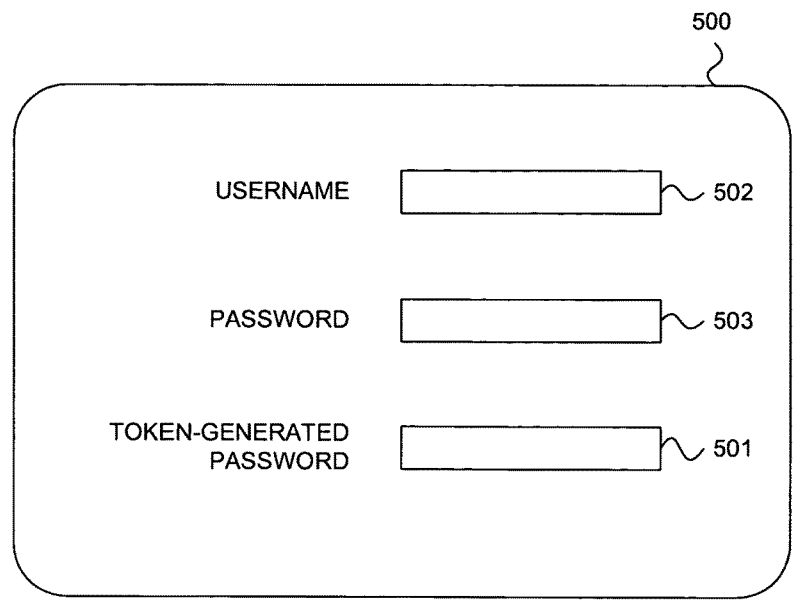
FIG. 5 is a screen shot of an electronic user interface usable to enter a first identity credential and a token-generated password in accordance with another embodiment of the present invention.

FIG. 5 is an electronic user interface 500 (for example, a web form) that a user uses to enter a first identity credential and a token-generated password 501. The first identity credential includes a username 502 and a password 503. Username 502 and password 503 are associated with a service provided by a service provider. In one example, the service is account access and the service provider is a bank. The token-generated password 501 is generated by a token that is provided by an authentication provider, where the authentication provider is not the service provider. The manner by which the token generates the token-generated password is unknown to the service provider. After the user enters the information solicited by user interface 500, the information is forwarded to the service provider for processing as described above. Such an electronic user interface can be displayed to the user on the screen of a personal computer, an automated teller machine (ATM), a point of sale device such as a gasoline pump.

Figure 6:
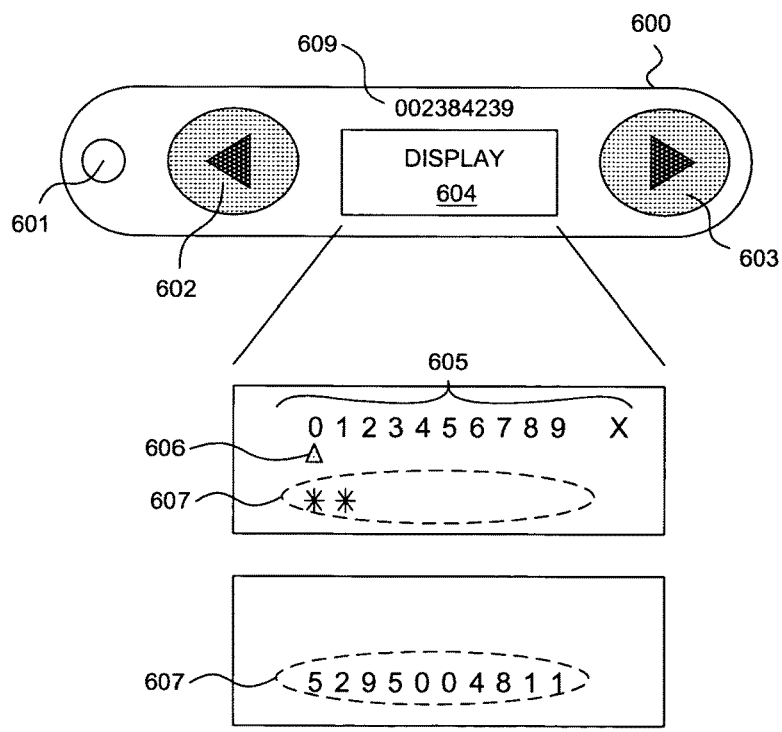
FIG. 6 is a top-down view of a two-button key-chain token in accordance with another embodiment of the present invention.

FIG. 6 is a top-down view of a two-button key-chain token 600. Token 600 attaches to a key chain (not shown) via hole 601. Token 600 has a left button 602, a right button 603, and a display 604. Display 604 has alphanumeric indicators 605, a caret 606, and an area for display output 607. The token 600 has a token identifier 609 printed on its face. A user enters a personal identification number (PIN) into token 600 using buttons 602 and 603 as follows. The user advances caret 606 to a desired alphanumeric character, and then pressed both buttons 602 and 603 simultaneously to selected the character. When the character is selected, an asterisk character appears in the output area 607. The user repeats this process to enter each successive alphanumeric character of the PIN. When all the characters of the PIN have been entered, the token 600 uses the PIN along with a predetermined algorithm to generate a token-generated password. The password is displayed in output area 607. Electronics within token 600 includes a battery-powered microcontroller similar to those found within an inexpensive calculator. The microcontroller performs button scanning functions, drives display 604, and calculates the token-generated password.

Although certain specific exemplary embodiments are described above in order to illustrate the invention, the invention is not limited to the specific embodiments. Although a representative example is detailed above, many other variations exist. The service providers may provide access to private networks such as a corporate network or a subscriber-based Internet connection. The token may be a scratch-off ticket or may be electronic device such as a smart card or secure ID such as provided by Secure Computing Corp., 601 Campus Drive, Suite 7, New Brighton, Minn. 55112, or as provided by RSA Security Systems. The token may be a software implementation running on a Personal Data Assistant or personal computer. In one example, the authentication provider supplies the user with a seed number which the user in turn enters into the token to initialize the token. A password generating mechanism within the token thereafter uses the seed number along with the password entered by the user upon each use to generate each successive token-generated password. Such a password generating mechanism may, for example, be built into or transferred into a cell phone, laptop personal computer, or other portable device. In this way, a user need not carry a separate token but rather a device already carried by the user (for example, a cell phone or personal data assistant) functions as the token that generates the token-generated passwords. Although a personal computer and ATM are described above as devices by which the user communicates the first identity credential and the token-generated password, other devices including telephones can be used. The communication can be an oral communication to a person such as, for example, a bank teller or a merchant. Although an example of the first identity credential is a username and password, other first identity credentials are possible. A photo identification card can be a first identity credential, where the photograph associates the photo identification card with the holder and where the name on the photo identification card can be used to link the holder with an account. Accordingly, various modifications, adaptations, and combinations of various features of the described embodiments can be practiced without departing from the scope of the invention as set forth in the following claims.

What is claimed is:

1. A method of granting a user access to a service, wherein a first computer system is a computer system of a service provider, wherein a second computer system is a computer system of an authentication provider, the method comprising:
   (a) receiving from the user and storing onto the first computer system a first username, a first password, and a second password, wherein the first username and the first password form a first identity credential;
   (b) retrieving a second username, wherein the second username and the second password form a second identity credential, the service provider verifying the first identity credential but not the second identity credential;
   (c) forwarding the second identity credential from the first computer system across a network to the second computer system without forwarding the first username or the first password received in (a);
   (d) receiving onto the first computer system verification of the second identity credential, wherein the verification is received across the network from the second computer system of the authentication provider, wherein the second computer system of the authentication provider does not store any user identity information, and wherein the verification received in (d) is a result of the authentication provider having verified the second identity credential without having received the first username from the service provider; and
   (e) granting the user access to the service if the service provider verifies the first identity credential received in (a) and if the service provider receives verification of the second identity credential from the authentication provider in (d), wherein the granting of (e) is performed by the service provider.

2. The method of claim 1, wherein the user is a customer trying to make a transaction using an Automatic Teller Machine (ATM), and wherein the second password is a one-time use password.

3. The method of claim 1, wherein the first identity credential is received in (a) via an oral communication from the user to the service provider.

4. The method of claim 1, wherein the second password is a password that was generated by an electronic security token.

5. The method of claim 4, wherein the user entered information into the electronic security token such that the token responded by displaying the second password.

6. The method of claim 1, wherein the user received the second password from a scratch-off ticket.

7. The method of claim 1, wherein the service is taken from the group consisting of: access to a financial account, and access to a network.

8. The method of claim 1, wherein the method is also for granting the user access to a second service, the method further comprising:
   (f) receiving a third identity credential from the user;
   (g) verifying the third identity credential;
   (h) interacting with the second computer system to obtain a second verification without communicating any part of the third identity credential to the authentication provider; and
   (i) as a result of the verifying of (g) and the second verification obtained in (h) granting the user access to the second service, wherein the second service is a service provided by the service provider, and wherein (f) thru (i) are performed by the first computer system.

9. A method comprising:
   (a) storing a token identifier in association with a bank account of a user, wherein the bank account is maintained by a bank, and wherein the token identifier is stored on a computer system of the bank;
   (b) receiving a username, a password, and a token-generated password from the user onto the computer system of the bank;
   (c) verifying a proper association between the username and the password and retrieving the token identifier stored in (a);
   (d) forwarding the token-generated password and the token identifier from the computer system of the bank to a computer system of a third party authentication provider without forwarding the username or the password received in (b) to the third party authentication provider;
   (e) receiving a verification of the token-generated password onto the computer system of the bank from the computer system of the third party authentication provider, wherein the computer system of the third party authentication provider does not store any user identity information, and wherein the verification received in (e) is a result of the third party authentication provider having verified the token-generated password without having received the username or the password; and
   (f) in response to verifying a proper association between the username and password in step (c) and receiving the verification in (e) granting the user access to the bank account, wherein at least (a) and (c) thru (f) are performed by the computer system of the bank.

10. A method, comprising:
   (a) receiving a first identity credential and a token-generated password by a service provider from a user and onto a server where the service provider verifies the first identity credential, wherein the service provider stores a token identifier associated with a service, and wherein the first identity credential is a username and a password;
   (b) retrieving the token identifier associated with the service, wherein the token identifier and the token-generated password received in (a) form a second identity credential;
   (c) forwarding the second identity credential from the server to a computer system of an authentication provider without forwarding the username or the password received in (a);
   (d) receiving verification of the second identity credential onto the server from the computer system of the authentication provider, wherein the computer system of the authentication provider does not store any user identity information, and wherein the verification received in (d) is a result of the authentication provider having verified the second identity credential without having received from the service provider information indicative of an identity of the user; and
   (e) causing the user to be granted access to the service if the service provider verifies the first identity credential in (a) and if the service provider receives verification of the second identity credential from the authentication provider in (d), wherein at least (b) thru (d) are performed by the server.

11. The method of claim 10, wherein the token-generated password is generated by an element taken from the group consisting of: a personal computer, a key-chain token, a smart card, a microcontroller, a cell phone, a personal data assistant, and a scratch-off ticket.

12. The method of claim 10, wherein the forwarding of step (c) does not involve forwarding any part of the first identity credential.

13. The method of claim 10, wherein the service is access to an account, wherein the service provider is a financial institution that controls the account, wherein the server is operated by the financial institution, and wherein prior to (a) the service provider receives the token identifier from the user and in response the service provider registers the token-identifier.

14. The method of claim 10, wherein the forwarding of the second identity credential in (c) is over a network.

15. The method of claim 10, wherein the service is taken from the group consisting of: access to a financial account, and access to a network.

16. A method comprising:
(a) storing a token identifier in association with a service;
(b) receiving from a user onto a server a username, a password, and a token-generated password via a network-connected device;
(c) verifying a proper association between the username and the password and retrieving the token identifier stored in (a);
(d) forwarding the token-generated password and the token identifier to a third party authentication provider without forwarding the username or the password received in (b);
(e) receiving a verification of the token-generated password from the third party authentication provider, wherein the third party authentication provider does not store any user identity information, and wherein the verification received is a result of the third party authentication provider having verified the token-generated password without having received information indicative of an identity of the user; and
(f) in response to verifying a proper association between the username and password and in response to receiving the validation in (e) granting the user access to the first service, wherein (b) thru (f) are performed by a service provider, wherein the token-generated password and the token identifier are forwarded in (d) from the server via a network to the third party authentication provider, and wherein the verification is received in (e) onto the server via the network.

17. The method of claim 16, wherein the service provider is a financial institution, wherein the financial institution operates the server, and wherein the service involves access to an account of the user.

18. The method of claim 16, wherein the service provider is taken from the group consisting of: a bank, a stock brokerage, a credit card company, a corporate network service, and an Internet service provider.

19. The method of claim 1, wherein the retrieving of the second username in (b) involves correlating the identity of the user with the second username established through prior arrangement.

20. The method of claim 1, wherein the second password was generated by a cellular telephone.

21. The method of claim 1, wherein the method of granting the user access to the service is a method of granting the user access via a network-connected device.

22. The method of claim 1, wherein the method of granting the user access to the service is a method of granting the user access via a network-connected device, and wherein the network-connected device is taken from the group consisting of: a personal computer, and an Automated Teller Machine (ATM).

23. The method of claim 1, wherein the forwarding of step (c) does not involve forwarding any part of the first identity credential, and wherein the authentication provider never receives any part of the first identity credential.

24. A method, comprising:
(a) receiving a first identity credential, wherein at least part of the first identity credential is received by a service provider from a user, wherein the service provider performs the receiving of (a);
(b) verifying the first identity credential, wherein the service provider performs the verifying of (b);
(c) receiving a token-generated password from the user, wherein the service provider performs the receiving of (c);
(d) provided that the first identity credential is verified in (b) then forwarding the token-generated password and a token identifier from a computer system of the service provider to a computer system of an authentication provider, wherein the forwarding of (d) occurs without forwarding any part of the first identity credential to the authentication provider;
(e) receiving verification of the second identity credential onto the computer system of the service provider from the computer system of the authentication provider, wherein the computer system of the authentication provider does not store any user identity information, and wherein the verification received in (e) is a result of the authentication provider having verified the second identity credential without having received from the service provider information indicative of an identity of the user; and
(f) granting the user access to the service if the service provider verifies the first identity credential in (b) and if the service provider receives verification of the second identity credential from the authentication provider in (e), wherein the granting of (f) is performed by the service provider.

25. The method of claim 24, wherein said at least part of the first identity credential is photographic information of a photograph that is part of a photo identification card.

* * * * *